United States Patent
Lee

[11] 3,935,751
[45] Feb. 3, 1976

[54] CENTRIFUGAL STEPLESS SPEED CHANGING DEVICE

[76] Inventor: Kuang-Chang Lee, 19, Lane 33, Ta Tung West Road, Tao Yuan, China /Taiwan

[22] Filed: Jan. 6, 1975

[21] Appl. No.: 539,026

[52] U.S. Cl. ............................ 74/230.18; 74/244
[51] Int. Cl.² ............................ F16H 55/54
[58] Field of Search ........... 74/230.18, 230.17 E, 74/230.17 R, 244, 217 CV, 230.16

[56] References Cited
UNITED STATES PATENTS

| | | | |
|---|---|---|---|
| 382,079 | 5/1888 | Ewart | 74/244 |
| 616,630 | 12/1898 | Pratt | 74/244 |
| 2,584,447 | 2/1952 | Hayot | 74/244 |

FOREIGN PATENTS OR APPLICATIONS

| | | | |
|---|---|---|---|
| 447,879 | 3/1949 | Italy | 74/244 |

Primary Examiner—Benjamin W. Wyche
Assistant Examiner—Allan R. Burke

[57] ABSTRACT

The present invention relates to a stepless speed changing device and more particularly to the construction of an automatic speed changing device suitable for a vehicle or the like, the centrifugal force of said changing device is produced by the high-speed rotation of a rotating means which enables a plurality of claw blocks fitted pivotely at a rotating disk to expand outward to increase the outside diameter thereof, and which, after the output of motive force, can produce automatically differential speed ratios of various magnitudes because of the change of said working outside diameters.

5 Claims, 5 Drawing Figures

CENTRIFUGAL STEPLESS SPEED CHANGING DEVICE

BACKGROUND OF THE INVENTION

The automatic speed changing device of the conventional vehicles are for the most part using an oildraulic control system; however, said oildraulic control system is too expensive and complicated in structure and limited by its construction is suitable only for use in automobiles and cannot be installed in a motorcycle.

SUMMARY OF THE INVENTION

The present invention relates to a stepless speed changing device and more particularly to the construction of an automatic speed changing device suitable for a vehicle or the like, the centrifugal force of said changing device is produced by the high-speed rotation of a rotating means which enables a plurality of claw blocks fitted pivotedly at a rotating disk to expand outward to increase the outside diameter thereof, and which, after the output of motive force, can produce automatically differential speed ratios of various magnitudes because of the change of said working outside diameters.

The principal object of the present invention is to provide an automatic stepless changer of simple structure, which can be installed in either an automobile or a motorcycle.

Another object of the present invention is to provide a centrifugal stepless speed changer wherein the centrifugal force produced by a rotating means of said device and a plurality of claw blocks to expand outward to increase the outside diameter thereof, owing to the change of the working outside diameters according to said claw blocks, thus the different speed ratios can be obtained.

The above and other objects and features of the present invention are described hereinafter in conjunction with the appended drawings in which:

BRIEF DESCRIPTION OF THE DRAWINGS

In FIG. 1, the present invention is mainly composed of a rotary disk 10, a positioning body 20 and a set of claw blocks 30. On said rotary disk 10 having a shallow groove 101 in the center is provided a plurality of holes 103—103, and at the periphery 104 of said rotary disk 10 are provided also projections 105—105 in a number corresponding to holes 103—103, in whose center is fitted shaft opening 102 with chaingroove. Said positioning body 20 having a plurality of grooves 202—202 on its bottom portion 201, after the said positioning body 20 is placed in the shallow groove 101 at the center of said rotary disk 10, the surface 203—203 of grooves 202—202 becomes a plane with the surface of said rotary disk 10. Said claw block 301 having a flange 302 to inset steadily from said groove 202 of the positioning body 20 and a hole 303 is provided at one end adjacent to the flange 302 so as to be pivotedly fixed with the hole 103 of the rotary disk 10 by means of a pin or a bolt for making it swing freely but not separate. One side 304 of said claw block 301 is a linear edge, the other side 305 is a curve edge and a V-shaped groove 306 is provided on the outward side portion for receiving an anti-slip belt 40 (as shown in FIG. 4).

Figure 1:
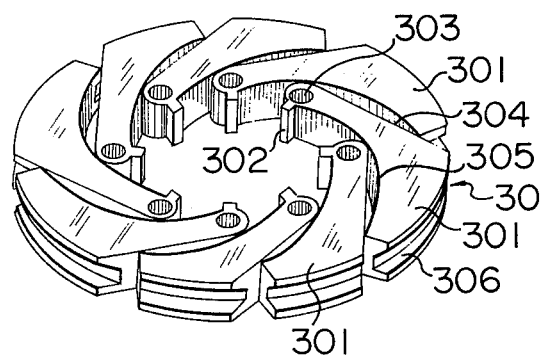
FIG. 1 is an exploded perspective view of an embodiment of the present invention.

After all the claw blocks 30—30 are pivotedly fitted on the rotary disk 10, they are controlled by various grooves 202—202 of the positioning body 20, enabling all the claw blocks 30—30 to simultaneously expand or contract, and the positioning body 20 is held tight to the bottom portion 201 by a flange 302 of claw block 30, thus said positioning body 20 will not separate and can perform a free rotation. After the claw blocks 30—30 pivotedly fixed on the rotary disk 10 are actuated by said rotary disk 10 and rotate with high speed owing to their special configurations, said claw blocks 30—30 produce readily a centrifugal force making the outside edges of all claw blocks 30—30 to expand outward. If the rotational speed exceeds a given figure, the centrifugal force of said claw blocks 30—30 reaches also the extremity, which finally makes the linear edges 304—304 of claw blocks 30—30 engaged at the projections 105—105 of said rotary disk 10 to prevent said claw blocks 30—30 from over-expansion and to avoid the separation of their flanges 302—302 from grooves 202—202 of the positioning body 20.

Figure 2A:
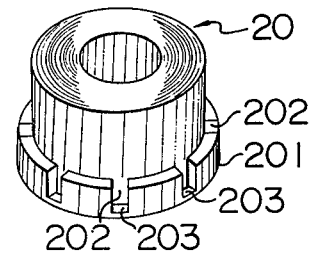
FIG. 2A is a plane view of a closure state of all claw blocks in the embodiment of the present invention.
Figure 2A:
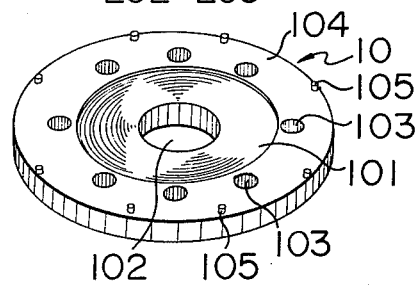
Figure 2A:
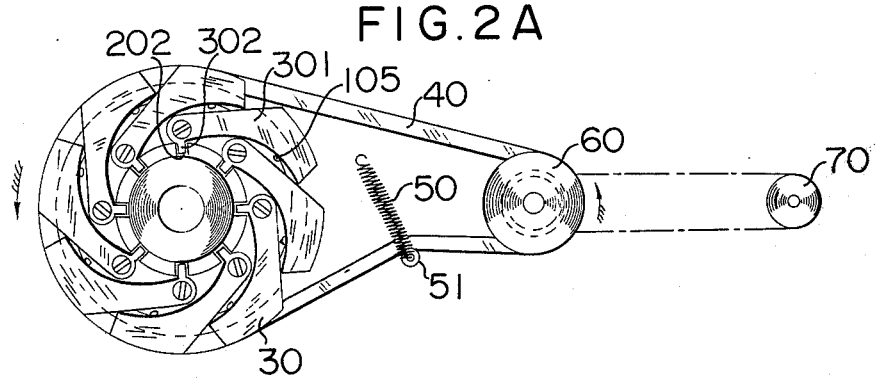
Figure 2B:
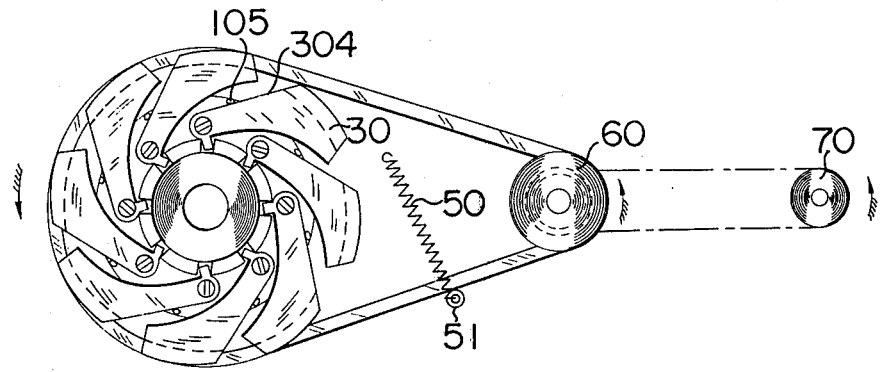
FIG. 2B is a plane view of all claw blocks expanding due to their own centrifugal force.

FIG. 2A is a plane view of an embodiment of the present invention fitted on a shaft connected with a source of motive force during operation. After said claw blocks 301—301 are assembled and pivotedly fitted on the rotary disk 10 and the positioning body 20, an anti-slip belt 40 is slipped over into said V-shaped grooves 306—306 of claw blocks 301—301 and is also connected with a pulley 60 by slipping over it. As shown in the figure, said claw blocks 301—301 rotate simultaneously counter-clockwise, and a roller 51 is provided at the outside of one side of the belt, the roller 51 being connected with a pulling spring 50, which is fixed on the frame. When said claw blocks 301—301 do not rotate or their centrifugal force during rotation is not sufficient to have the claw block 30 expanding, said spring 50 will pull tight one side of the belt 40 by virtue of the roller 51 so as to increase the friction of the V-shaped groove of claw block during starting and to avoid excessive vibration to prevent separation during high-speed rotation. The condition of the claw block's expansion to extremity is shown as in FIG. 2B. All the linear edges 304—304 of claw blocks 30—30 are engaged tight against the projections 105—105 of rotary disk 10, and both the belt 40 and spring 50 extend also to the largest degree. During starting, because of the friction of the motive force output axle 70 and of the ground surface on the pulley 40, the tension portion of belt 40 is pulled tight and the claw blocks 30—30 rub only the drive belt 40 and are unable to expand their outer edges; after having started and driven for a little while, the vehicle itself produces inertia, decreasing highly the frictional resistance of the motive force output axle 70 and of the ground surface, and, at the same time, the friction of belt 40 in the V-shaped grooves of the claw blocks 30—30 decreases also correspondingly, while the claw block 30 and the rotary disk 10 continues rotating at increasing speed, making each claw block 30 to produce centrifugal force. If said centrifugal force becomes larger and larger until it is neither restricted by the belt 40 nor drawn by the spring 50, the outer edge of the claw block will certainly expand gradually, and, as the claw blocks are pivotedly fixed on the rotary disk, when the centrifugal force becomes larger and larger, the claw blocks will certainly expand gradually to the upper limit; or if during braking, the friction of the motive force output wheel increases, the friction between the belt and the claw blocks increases also correspondingly, then the centrifugal force will be restricted, having the belt to gradually retract and close the claw blocks. In the meanwhile, the spring 50 can also tighten the belt 40. Hence, in the automatic speed changer according to the present invention, the change of speeds depends actually upon the frictional forces between the motive force output wheel and the ground surface or upon other additional friction. The motive force of engine is transmitted from the rotation of claw blocks to the pulley through the belt, and it is further conveyed by the pulley to drive the vehicle through the actuating wheel, and, therefore, during the expansion or retraction of the outer edges of claw blocks the differential speed ratios between these mechanisms can be readily changed.

Figure 3:
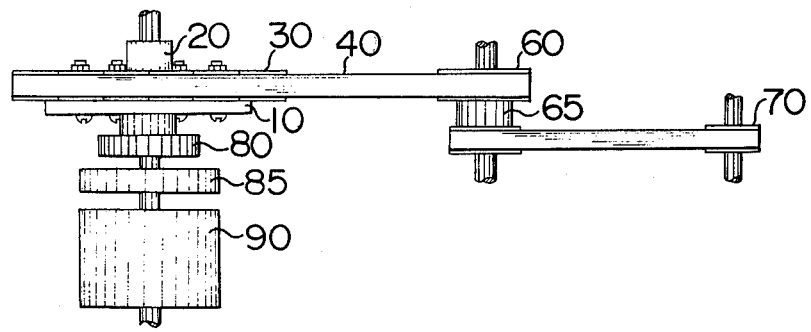
FIG. 3 is a top view of a device according to the present invention installed on a motorcycle for use.

FIG. 3 is a top view of a device according to the present invention installed on a motorcycle in operation. The motive force produced by an engine 90 transmits a clutch 80 with a same shaft through a flywheel 85; at the other end of said clutch 80 is provided the rotary body 10 with claw block 30 and positioning body 20 of an automatic speed changing construction according to the present invention. The motive energy is transmitted to the pulley 60 through a belt 40, meshed further with a set of transmission gears 65 on a same shaft, so as to separate at a neutral position or to mesh in a gearing position, enabling the motive force to be transmitted to the motive force output axle 70 under control as desired.

Figure 4:
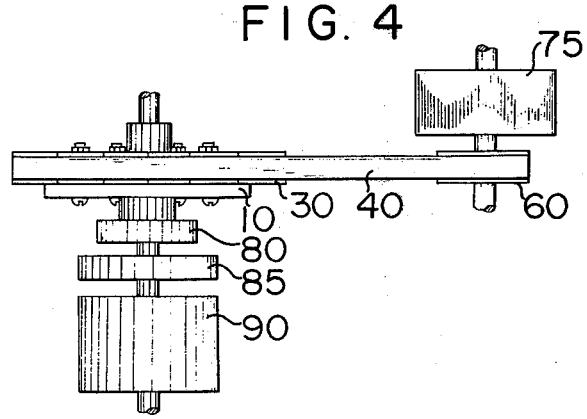
FIG. 4 is a top view of a device according to the present invention installed on an automobile for use.

FIG. 4 is a top view of a device according to the present invention installed on an automobile in operation. The motive force is transmitted out by conveying the motive force from an engine 90 to the automatic speed changer through a flywheel 85 and further through a clutch 80, and it is furthermore conveyed from a belt to a pulley 60, by means of a transmission mechanism 75 on a same shaft. Said transmission mechanism 75 includes separation, meshed gearing and backward gearing, while its function of speed-changing is identical to the conventional speed-changing box of an automobile with several advantages.

It should be noted that the present invention may be embodied into other specific forms without departing from its spirit or essential characteristics. The present embodiment is, therefore, to be considered in all respects as illustrative and not restrictive, the scope of the present invention being indicated by the claims rather than by the foregoing description, and all changes which come within the meaning and range of the equivalents of the claims are therefore intended to be embraced therein.

I claim:

1. A centrifugal stepless speed changing device comprising a rotary disk having a top surface and a shallow annular groove at its central portion and a plurality of holes arranged around said shallow groove; a positioning body having a bottom portion with a plurality of grooves, each of which grooves has a bottom surface the bottom portion of said positioning body is mounted on said shallow annular groove of said rotary disk; and a claw blocks set having a plurality of claw blocks are arranged in sequence, each of said claw blocks having a flange at one end and a V-shaped groove at the other end for receiving a belt, a hole is provided adjacent to said flange end, said flanges of said claw blocks are placed on said grooves of the positioning body respectively and assembled together by means of a plurality of bolts through said holes of the claw blocks and the holes of said rotary disk.

2. A device according to claim 1, wherein said rotary disk further having a plurality of projections on its top surface.

3. A device according to claim 1, wherein each of the claw blocks have a linear side and a curve side and the linear side of one claw block is adjacent to the curve side of the next claw block in regular sequence.

4. A device according to claim 1, wherein one end of an anti-slip belt is mounted on said V-shaped grooves of said claw blocks and another end of said belt is slipped over on a pulley, a spring biased tensioning roller, said roller being mounted beside said biasing a slack side of said anti-slip belt.

5. A device according to claim 1, wherein the bottom surface of said grooves of the positioning body becomes co-planar with the top surface of said rotary disk when the positioning body is placed in the shallow annular groove of said rotary disk.

* * * * *